US012133028B1

(12) United States Patent
Pachikov et al.

(10) Patent No.: US 12,133,028 B1
(45) Date of Patent: Oct. 29, 2024

(54) ENHANCING ZOOMING CAPABILITIES OF A SECURITY CAMERA BY AUTOMATICALLY EMPLOYING A MULTICOPTER

(71) Applicant: Sunflower Labs Inc., San Carlos, CA (US)

(72) Inventors: Alexander S. Pachikov, San Carlos, CA (US); Phil Libin, Bentonville, AR (US)

(73) Assignee: Sunflower Labs Inc., San Carlos, CA (US)

( * ) Notice: Subject to any disclaimer, the term of this patent is extended or adjusted under 35 U.S.C. 154(b) by 114 days.

(21) Appl. No.: 17/994,869

(22) Filed: Nov. 28, 2022

Related U.S. Application Data

(60) Provisional application No. 63/285,121, filed on Dec. 2, 2021.

(51) Int. Cl.
| | | |
|---|---|---|
| *H04N 7/18* | (2006.01) | |
| *B64C 39/02* | (2023.01) | |
| *B64D 47/08* | (2006.01) | |
| *H04N 23/69* | (2023.01) | |

(52) U.S. Cl.
CPC ........... *H04N 7/183* (2013.01); *B64C 39/024* (2013.01); *B64D 47/08* (2013.01); *H04N 23/69* (2023.01)

(58) Field of Classification Search
CPC ...... H04N 7/183; H04N 23/69; B64C 39/024; B64D 47/08

USPC ........................................................ 348/143
See application file for complete search history.

(56) References Cited

U.S. PATENT DOCUMENTS

| | | | |
|---|---|---|---|
| 11,016,487 B1* | 5/2021 | Roberts | G08B 25/08 |
| 11,745,870 B1* | 9/2023 | Nevdahs | B64U 10/13 |
| | | | 244/17.13 |
| 2021/0004950 A1* | 1/2021 | Kondamari | G06T 7/0002 |
| 2021/0075969 A1* | 3/2021 | Liu | H04N 23/667 |
| 2022/0335797 A1* | 10/2022 | Salgar | G06V 20/53 |
| 2023/0071428 A1* | 3/2023 | Keene | G01V 3/08 |

* cited by examiner

*Primary Examiner* — Allen C Wong
(74) *Attorney, Agent, or Firm* — Muirhead and Saturnelli, LLC

(57) ABSTRACT

Viewing an object detected within a property perimeter includes using a fixed camera to view the object, adjusting optical zoom and/or digital zoom of the fixed camera in response to an initial image of the object from the fixed camera being of insufficient quality to fully assess the unknown object, using different zoom levels of the fixed camera to determine a satisfactory zoom level based on a relationship between zoom level, image quality, and security threat forecast, dispatching a multicopter with a camera to a location of the unknown object in response to the fixed camera being unable to reach the satisfactory zoom level, and providing an image of the unknown object from the camera of the multicopter. The multicopter may be dispatched following interpolating a forecast line to determine that the fixed camera is unable to reach the satisfactory zoom level. Dispatching the multicopter may include optimizing flight trajectory.

20 Claims, 5 Drawing Sheets

ENHANCING ZOOMING CAPABILITIES OF A SECURITY CAMERA BY AUTOMATICALLY EMPLOYING A MULTICOPTER

CROSS-REFERENCE TO RELATED APPLICATIONS

This application claims priority to U.S. Prov. App. No. 63/285,121, filed on Dec. 2, 2021, and entitled "ENHANCING ZOOMING CAPABILITIES OF A SECURITY CAMERA BY AUTOMATICALLY EMPLOYING A MULTICOPTER", which is incorporated herein by reference.

TECHNICAL FIELD

This application is directed to the fields of information processing in the area of security systems with stationary cameras and mounted cameras on autonomous aerial vehicles, and more particularly to the field of enhancing zooming capabilities of a security camera.

BACKGROUND OF THE INVENTION

Following increased concerns about general, industrial, urban and residential security, the market for security systems is growing at accelerated pace. There has been a dramatic increase in the demand for security applications to monitor and record borders, ports, transportation infrastructure, corporate houses, educational institutes, public places, buildings, and private property, including various types of dwellings, such as tower blocks, regular apartment blocks, condominiums, and private homes.

There is a large spectrum of offerings of electronic security products, systems, and services, ranging from basic alarms to sophisticated wireless video surveillance (CCTV) solutions with cloud-based processing and storage and cross-platform user interfaces. CCTV solutions represent the fastest growing segment of the market. By some estimates, the global video surveillance market was valued at $48.7 billion in 2022 and is projected to reach $76.4 billion by 2027 with a compound annual growth rate (CAGR) of 9.4% for 2022-2027. More aggressive forecasts expect the size of the global surveillance market to reach over $108 billion in 2030 with the CAGR of 10.9%

In many countries, every significant city is heavily surveilled, with the number of CCTV cameras per 1000 people reaching 73-117 for the world's top three cities having the greatest video surveillance density (Taiyuan and Wuxi in China and London in the UK).

In contrast with the public city infrastructure, large industrial objects and private properties have on average a relatively low number of CCTV cameras. While the US leads all countries by the count of security cameras per capita—15.28 per hundred people, of the 76 million free-standing single-family homes in the US, almost 56 million are situated in lightly populated areas, outside of city centers and dense urban environments, and only around 30% of those homes currently have any kind of a home security system (US Census data).

Accordingly, surveillance capabilities of CCTV cameras for a variety of industrial and home conditions are subject to significant limitations.

In addition to fixed cameras attached to various objects within the security perimeter, companies such as Sunflower Labs Inc. are offering mobile security solutions where video surveillance is conducted, fully or partially, by multicopters (drones, UAVs—Unmanned Aerial Vehicles). Multicopters may permanently reside on an industrial object or a private property and be protected from weather conditions and other damaging events by fully covered landing platforms.

One of the key efficiency factors of a CCTV camera is its zooming capability, allowing a more detailed look, or a wider-angle view on any suspicious objects or activities within the camera surveillance area. Advanced CCTV cameras have a hybrid zooming capability, combining optical and digital zoom. Some of the best CCTV cameras on the market, such as Samsung SNP-5430H, offer over 43× magnifying capability with optical zoom. The Samsung SNP-5430H also provides up to 16× digital zoom capability. Additionally, IP (Wi-Fi) security cameras with motorized optical zoom allow remote adjustment of zoom level using on-screen controls on a mobile device or in client software. The most advanced PTZ (Pan Tilt Zoom) optical zoom security cameras are fully motorized and some PTZ cameras offer up to 360 degrees pan, 90 degrees tilt and high optical zoom levels.

SUMMARY OF THE INVENTION

Notwithstanding significant progress in developing high quality zoom capabilities of CCTV cameras, current product offerings and integration of the current product offerings into surveillance solutions require significant improvements. Optical zoom with high magnification levels often reduces the viewing angle on the zoom in operation when the user intends to get clearer image details. Moreover, optical zoom cannot be added to a previously recorded surveillance video when such videos are undergoing surveillance reviews. As to digital zoom, its capabilities are essentially reduced to an enlarged cropping of the captured CCTV video by stretching the cropped area. Thus, digital zoom may result in pixilation and blurry images if the recorded videos are zoomed too closely.

Accordingly, it is desirable to create techniques, systems, and workflows to expand zoom capabilities of CCTV cameras and the corresponding surveillance solutions to overcome existing limitations.

According to the system described herein, viewing an object detected within a property perimeter includes using a fixed camera to view the object, adjusting optical zoom and/or digital zoom of the fixed camera in response to an initial image of the object from the fixed camera being of insufficient quality to fully assess the unknown object, using different zoom levels of the fixed camera to determine a satisfactory zoom level based on a relationship between zoom level, image quality, and security threat forecast, dispatching a multicopter with a camera to a location of the unknown object in response to the fixed camera being unable to reach the satisfactory zoom level, and providing an image of the unknown object from the camera of the multicopter. The relationship between zoom level and values of image quality, and security threat may be provided using a forecast line corresponding to points on a two-dimensional surface in a three-dimensional space having axes corresponding to the zoom level and the values of the image quality and the security threat, and the points may correspond to specific pairs of values for security threat and image quality at different zoom levels. The multicopter may be dispatched following interpolating the forecast line to determine that the fixed camera is unable to reach the satisfactory zoom level. Dispatching the multicopter may include optimizing flight trajectory of the multicopter. Viewing an object detected within a property perimeter may also include displaying a countdown estimate of flight time for the multicopter to reach the unknown object. The camera of the multicopter may provide an image as the multicopter approaches the unknown object. The flight trajectory may be based, at least in part, on being able to view the unknown object using the camera of the multicopter as the multicopter is approaching the unknown object. The image from the fixed camera and the image from the camera of the multicopter may be provided to a screen of an operator. Viewing an object detected within a property perimeter may also include determining reasons why the initial image from the fixed camera is of insufficient quality. The reasons may include distance between the fixed camera and the unknown object, a size of the unknown object, overall visibility conditions due to atmospheric and lighting conditions, reflective properties of one or more surfaces of the unknown object, and/or obstacles to a clear line-of-sight between the fixed camera and the unknown object. The unknown object may be initially detected by the fixed camera. The unknown object may be initially detected by a vibration sensor. Viewing an object detected within a property perimeter may also include adjusting position of the multicopter and/or view angle of the multicopter in response to an initial image from the camera of the multicopter having insufficient quality. Viewing an object detected within a property perimeter may also include the multicopter following the unknown object in response to movement by the unknown object.

According further to the system described herein, a non-transitory computer readable medium contains software that facilitates viewing an object detected within a property perimeter. The software includes executable code that uses a fixed camera to view the object, executable code that adjusts optical zoom and/or digital zoom of the fixed camera in response to an initial image of the object from the fixed camera being of insufficient quality to fully assess the unknown object, executable code that uses different zoom levels of the fixed camera to determine a satisfactory zoom level based on a relationship between zoom level, image quality, and security threat forecast, executable code that dispatches a multicopter with a camera to a location of the unknown object in response to the fixed camera being unable to reach the satisfactory zoom level and executable code that provides an image of the unknown object from the camera of the multicopter. The relationship between zoom level and values of image quality, and security threat may be provided using a forecast line corresponding to points on a two-dimensional surface in a three-dimensional space having axes corresponding to the zoom level and the values of the image quality and the security threat, and the points may correspond to specific pairs of values for security threat and image quality at different zoom levels. The multicopter may be dispatched following interpolating the forecast line to determine that the fixed camera is unable to reach the satisfactory zoom level. Dispatching the multicopter may include optimizing flight trajectory of the multicopter. The software may also include executable code that displays a countdown estimate of flight time for the multicopter to reach the unknown object. The camera of the multicopter may provide an image as the multicopter approaches the unknown object. The flight trajectory may be based, at least in part, on being able to view the unknown object using the camera of the multicopter as the multicopter is approaching the unknown object. The image from the fixed camera and the image from the camera of the multicopter may be provided to a screen of an operator. The software may also include executable code that determines reasons why the initial image from the fixed camera is of insufficient quality. The reasons may include distance between the fixed camera and the unknown object, a size of the unknown object, overall visibility conditions due to atmospheric and lighting conditions, reflective properties of one or more surfaces of the unknown object, and/or obstacles to a clear line-of-sight between the fixed camera and the unknown object. The unknown object may be initially detected by the fixed camera. The unknown object may be initially detected by a vibration sensor. The software may also include executable code that adjusts position of the multicopter and/or view angle of the multicopter in response to an initial image from the camera of the multicopter having insufficient quality. The multicopter may follow the unknown object in response to movement by the unknown object.

The proposed system enhances zooming capabilities of a fixed camera by continuous assessment of image quality of detected unknown objects within the security perimeter of the camera, identifying the state when the camera has reached maximum zooming levels of the camera through optical and/or digital zoom and in cases where the sufficient level and clarity of detail of the unknown objects has not been attained, dispatching a multicopter with a video camera to stream object videos from a position, distance and view angle to facilitate securing sufficient quality of zooming. The system estimates a desired position and delay in obtaining enhanced zoomed images and may display countdown information on the screen of operator devices.

Various aspects of system architecture and functioning are explained as follows.

1. A fixed security camera or other type of sensor that is not a camera (e.g., a vibration sensor) may initially detect an unknown object or multiple objects within an observation (surveillance, security) area in a situation when an operator, a fully automatic surveillance system, or a semi-automatic surveillance system does not have sufficient clarity, resolution and/or level of detail for object categorization, identification, and assessment of potential risk levels. In such a case, the system may be incapable of generating alarms, notifying decision-makers, and taking other necessary actions.

Note. The system may use additional sensors to categorize objects based on capturing their static and dynamic parameters, as described in U.S. Pat. No. 10,614,688 titled: "DETECTING AND IDENTIFYING ACTIVITIES AND EVENTS WITHIN A PROPERTY'S SECURITY PERIMETER USING A CONFIGURABLE NETWORK OF VIBRATION AND MOTION SENSORS", issued on Apr. 7, 2020 by Pachikov, et al., and in U.S. Pat. No. 10,706,696 titled: "SECURITY SYSTEM WITH DISTRIBUTED SENSOR UNITS AND AUTONOMOUS CAMERA VEHICLE", issued on Jul. 7, 2020 by Pachikov, et al., both of which are incorporated by reference herein. The system proposed herein may operate in situations where neither one or more fixed cameras nor additional sensor units (when applicable) have been able to reliably identify new object(s).

2. The security camera may zoom the unknown object(s) using optical and digital capabilities of the security camera with the purpose of obtaining necessary image quality, which may be progressively assessed as the object zooming switches to higher levels and, optionally, the view axis and the view angle are altered (as may be the case with PTZ cameras).

3. Simultaneously with zooming, the system may continuously assess (manually, semi-automatically or fully automatically) a visual quality of the captured new object images, possible reasons for any insufficient visual quality, and potential security threats posed by unknown objects based on information obtained from a moment of a discovery of new objects. Such assessments may be provided by a separate system component responsible for analytics and control. The assessments may include, in addition to the estimated distance between the camera and the detected objects and size of the objects, the overall visibility conditions due to atmospheric and lighting conditions, the reflective properties of the object surfaces, obstacles to a clear line-of-sight, object categorization obtained by different types of sensors and available (incomplete) visual characteristics, etc. Additionally, the system may forecast (extrapolate) the visual quality of objects with the increased zooming levels.
4. If the forward assessment (forecast) shows that the security camera is approaching a limit of zooming capabilities, while the level of detail and the clarity of the object images are still insufficient, the forecast doesn't show an anticipated significant improvement and the assessed risks (security threats) of misinterpreting the objects is sufficiently high, the system may enhance the zooming solution by dispatching a multicopter to stream live video from a distance that ensures the sufficient zoom quality, as explained in more detail elsewhere herein.
5. The system may use the collected information about object location, size, reflective properties, weather, lighting conditions, etc. to project the target multicopter position and view angle for capturing quality images of the tracked objects with a sufficient level of detail. Additionally, the system may optimize a departure time of the multicopter before the fixed camera reaches a resolution limit of the fixed camera in order to shorten potential delays in obtaining improved images.
6. Based on an estimated target multicopter position, the system may optimize multicopter flight trajectory and determine a required flight time. The flight time may be displayed on screen(s) of monitoring device(s), for example, in the form of a countdown indicator, showing progress of the multicopter flight.
7. Upon reaching the target position and completing the targeting sequence to obtain an optimal viewing angle, the multicopter may start capturing the tracked objects with a camera of the multicopter and may stream live video to the surveillance system, ensuring the sufficient quality and level of detail of images, thus providing an extension to the original fixed location camera based capturing that has reached limits without reaching surveillance goals, as explained elsewhere herein.
8. Depending on the conditions, tasks and decisions made based on a quality of a view of the tracked objects, the multicopter may continue tracking, following the objects as the objects move through the surveillance territory. If the objects move closer to the fixed camera, the multicopter may continue surveillance or stop video streaming depending on the situation.
9. The multicopter may start video capturing and streaming before reaching the target position to provide a smooth transition from a most recent view provided by the fixed camera and the required quality of a view secured by the multicopter camera. To implement this, the system may optimize the flight trajectory under an additional restriction that the multicopter camera be oriented toward the unknown objects at a final segment of the trajectory and may capture the unknown objects within a view area of the multicopter.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for enhancing a user interface and zooming capabilities of a fixed surveillance camera by employing a multicopter for expanding zooming quality and clarity of images of unknown objects beyond the limits of optical zooming potential and digital zooming potential of the fixed camera.

Figure 1:
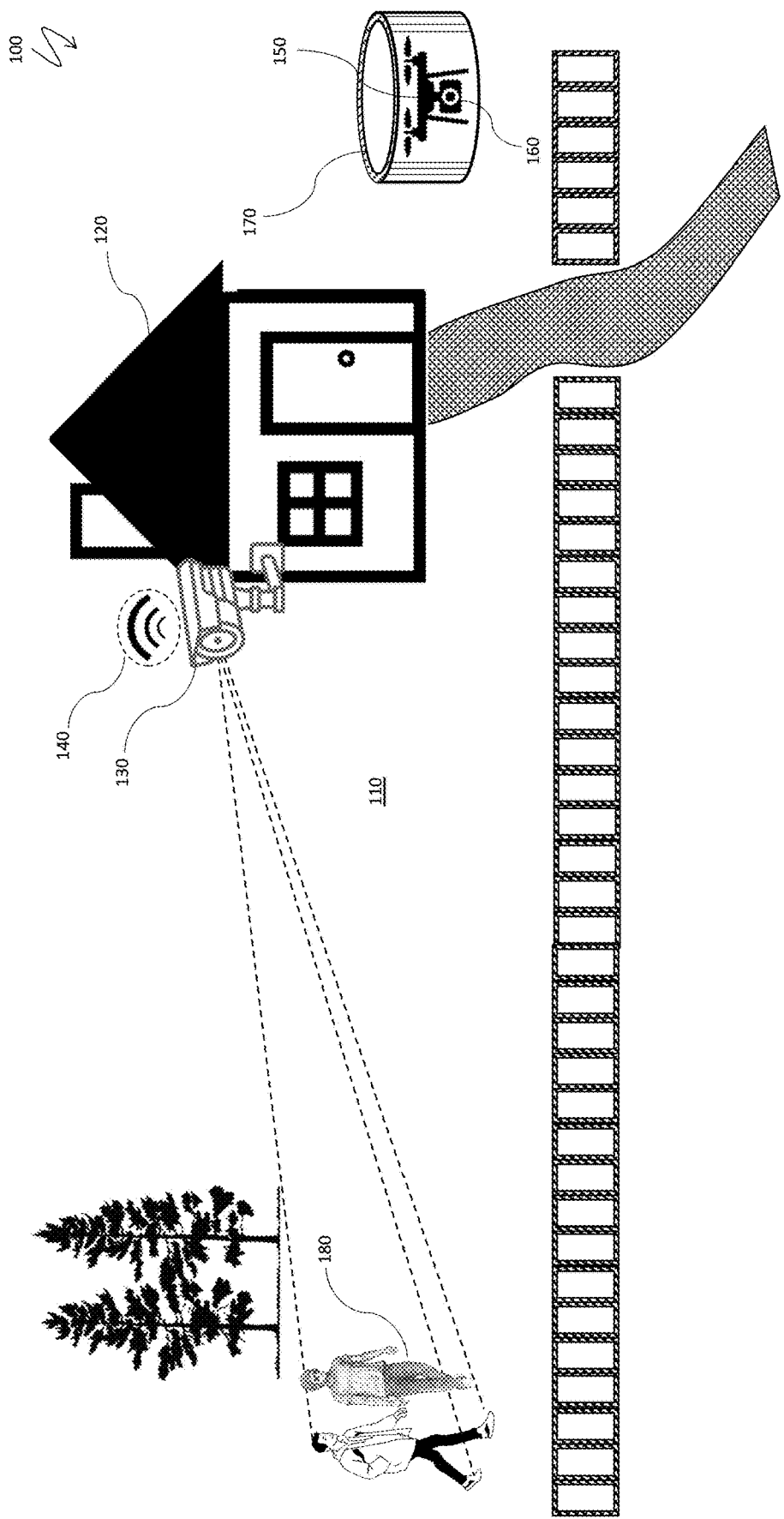
FIG. 1 is a schematic illustration of a property with a fixed security camera and a multicopter with a landing platform, according to an embodiment of the system described herein.

FIG. 1 is a schematic illustration 100 of a property with a fixed security camera and a multicopter with a landing platform. A property 110 with a dwelling 120 uses a fixed surveillance camera 130 with optional wireless connectivity 140 for monitoring a perimeter of the property 110. Additionally, a multicopter (UAV) 150 with a camera 160 is located at a landing platform 170 and may be periodically dispatched to perform various surveillance tasks. The fixed camera 130 has detected unknown objects 180 and the system is trying to obtain detailed and clear images of the objects.

Figure 2:
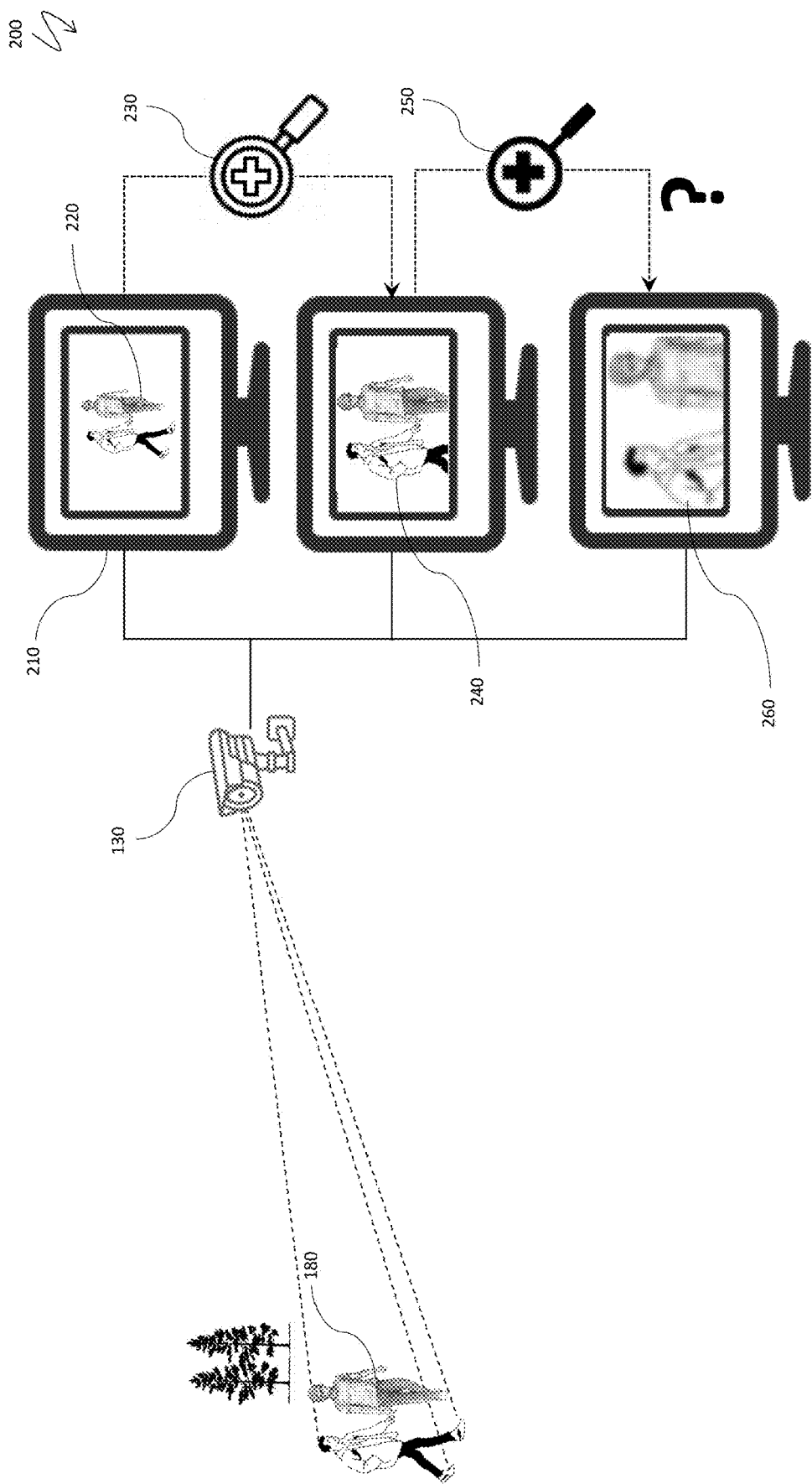
FIG. 2 is a schematic illustration showing insufficient quality of a view provided by zooming modes of a fixed camera, according to an embodiment of the system described herein.

FIG. 2 is a schematic illustration 200 showing insufficient quality of a view provided by zooming modes of a fixed camera 130. The fixed camera 130 has detected the unknown objects 180, as explained in FIG. 1 and the accompanying text, and displays an image 220 of the unknown objects 180 on a screen 210 that is viewed by an operator. The image 220 lacks sufficient details and the system directs the camera (manually, automatically, or semi-automatically) to apply optical zoom 230 to provide a better image quality, as explained elsewhere herein. However, even a highest level of optical zoom available for the fixed surveillance camera 130 produces a zoomed image 240 that is still insufficient to fully assess the unknown objects 180 (i.e., identify sufficiently to predict a security threat level of the objects 180). At a next step, the system applies digital zoom 250, which provides an image 260, where the size of the unknown objects 180 is sufficient but the unknown objects 180 are blurred (for reasons explained elsewhere herein) and the combination of optical and digital zoom still does not solve the surveillance task.

Figure 3:
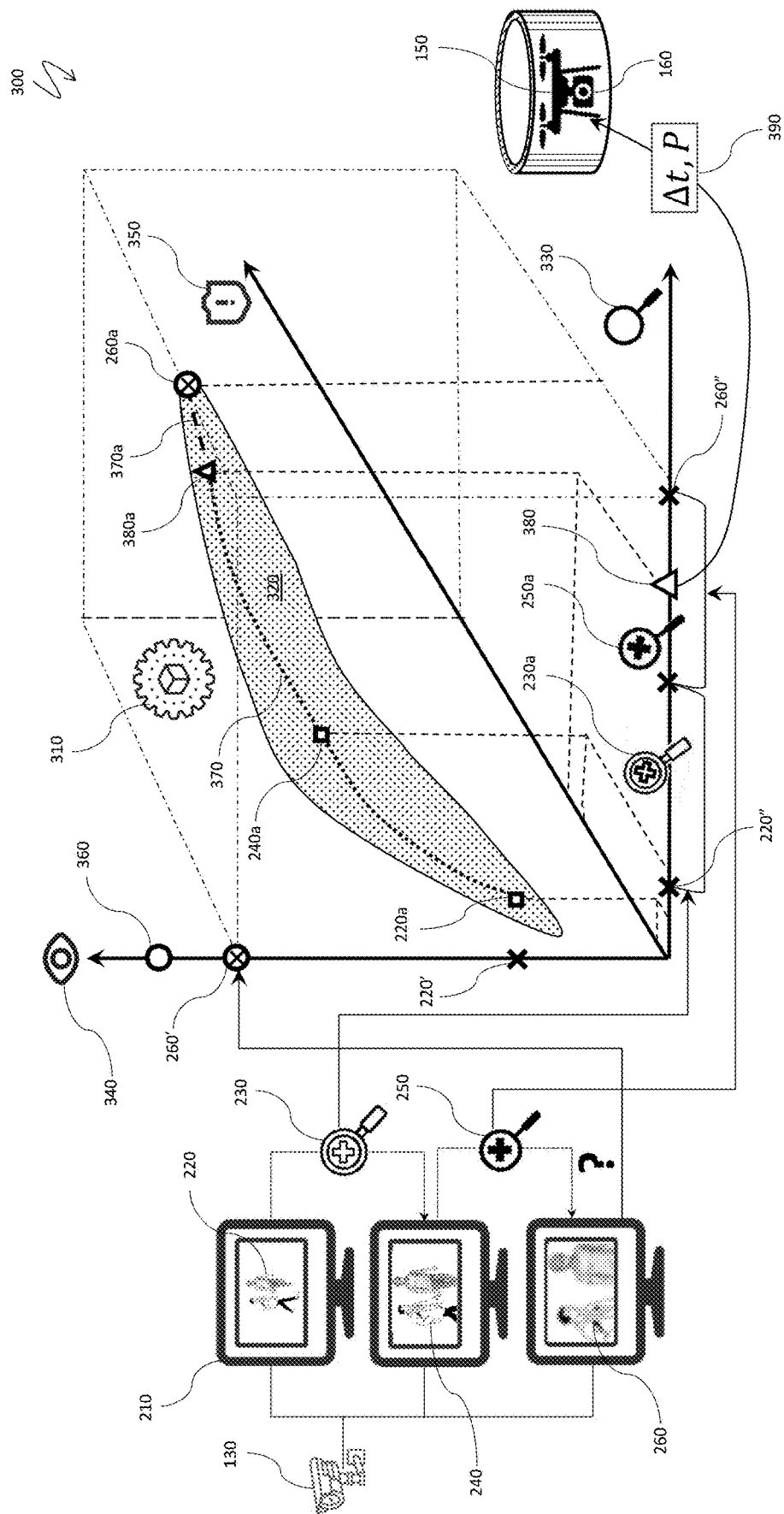
FIG. 3 is a schematic illustration showing design and functioning of an automated analytics and control software component of the system, according to an embodiment of the system described herein.

FIG. 3 is a schematic illustration 300 showing design and functioning of an automated analytics and control software component 310 of the system. The automatic analytics and control software component 310 of the system operates with an assessment surface 320 in a multi-dimensional space shown in FIG. 3 as a three-dimensional space with coordinate axes 330, 340, 350 representing a zoom level of the surveillance camera (the axis 330), image quality (the axis 340, summarizing size/level of details/clarity of the camera image for a given zoom level, which may be presented in a multi-dimensional space in its own right or may use a single aggregated numerical index of the image quality), and a security threat posed by the unknown object(s) (the axis 350, which may also be a single aggregated number or a multi-parametric and multi-dimensional estimate).

A desired (satisfactory or ideal) level of image quality 360 may or may not be achieved by the camera zooming capabilities alone. FIG. 3 illustrates a case when satisfactory quality is not achieved, following the image capturing conditions of the camera 130 in FIG. 2, which are partially reproduced on the left side of FIG. 3.

Initially, the fixed camera 130 captures unknown objects at a significant distance and displays on the screen 210 of the operator the first image 220 of the unknown objects. In the coordinate system of the analytics and control component 310, capturing unknown objects at a significant distance corresponds to a three-dimensional point 220a on the assessment surface 320 (note that an initial no-zoom segment of the axis 330 is artificially added for an illustrative purpose; camera zoom starts at a point 220"). Clearly, an image quality 220' at the point 220" is far below a desired value 360, so the camera 130 starts zooming, first with the optical zoom 230. A segment 230a of the optical zoom 230 is marked on the axis 330 and an intermediate image 240 of the unknown objects obtained within the segment 230a (still of a subpar quality) is mapped onto the assessment surface 320 as a point 240a. At some moment, the camera 130 switches to the digital zoom 250, shown by a segment 250a on the zoom axis 330, and new points for the current zooming session are added by the component 310 to the assessment surface 320.

The assessment of parameters of the image stream delivered by the fixed camera, depicted by the points 220a, 240a on the assessment surface 320, leads to the interpolation by a forecast line (curve, function) 370, representing the dynamics of image quality and security threats within the current zooming session. An extrapolating forecast power of the image stream is also assessed continuously and is used to make important decisions about the progress of the session. At an intermediate zoom level 380, the analytics and control component gains enough predictive capability to assess a forecasted future value 260a on the assessment surface 320 at a maximum digital zoom capacity 260", as shown by a long-dashed segment 370a of the forecast line. Note that the point 260a on the assessment surface 320 corresponds to the final zoomed image 260 in FIG. 2 and in a replica of the final zoomed image 260 provided in FIG. 3.

In FIG. 3, a prognosis delivered by the forecast at an intermediate zoom level 380 is negative: the projected image quality 260' expected at the maximum zoom level 260" is still significantly below the desired level 360. This assessment makes the intermediate zoom level 380 a decision point. Specifically, the analytics and control component performs two actions: (i) assesses the target position P of the multicopter 150 at the future moment when the camera 160 of the multicopter will be able to start capturing quality images of the unknown object(s), and the flight time Δt required for the multicopter to reach that position; and (ii) optimizes a trajectory of the multicopter 150 and dispatches the multicopter 150 to perform the image capturing task, as explained in more detail in FIG. 4 and the accompanying text. Note that the analytics and control component continues functioning during the capturing and streaming of object images by the multicopter camera (this is not shown in FIG. 3).

Figure 4:
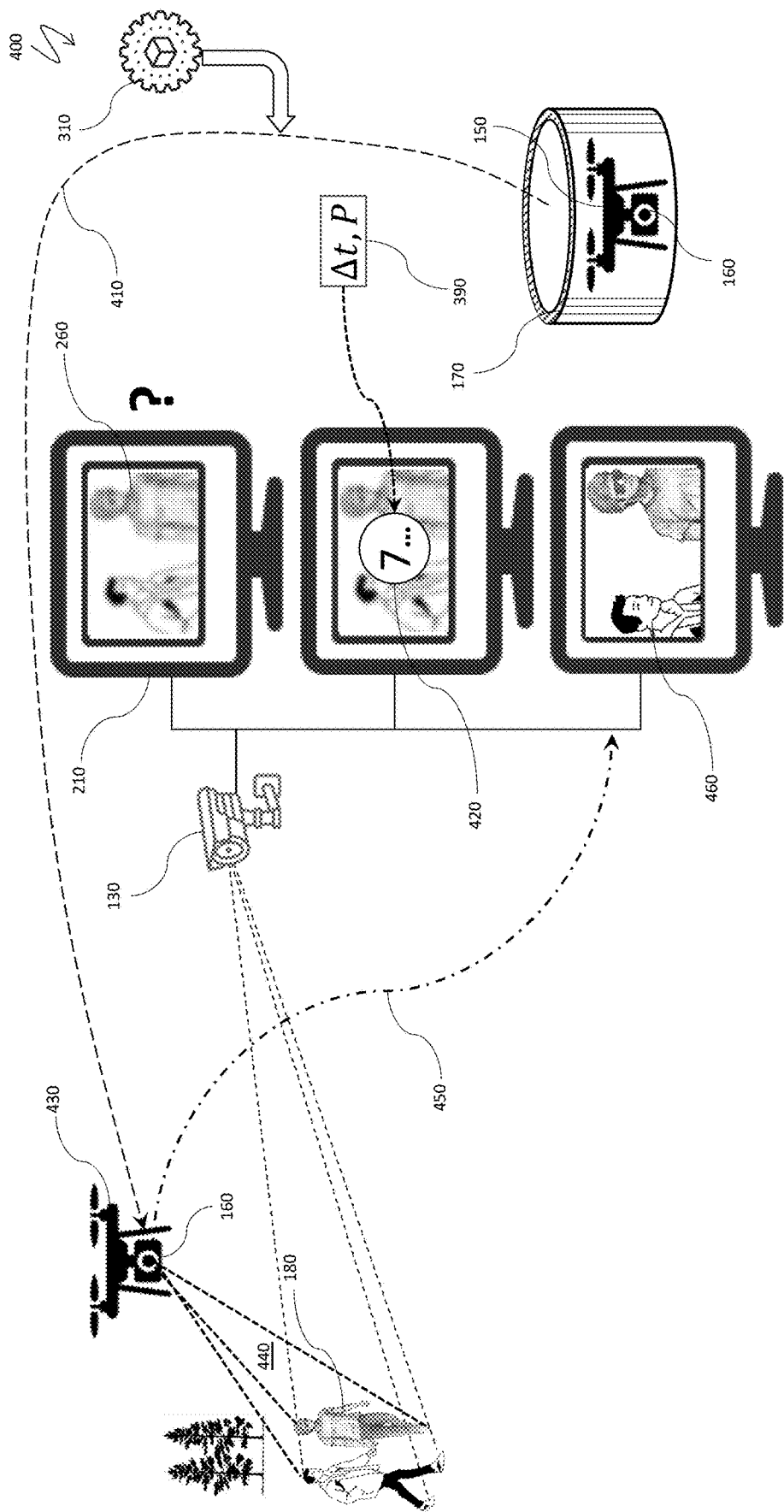
FIG. 4 is a schematic illustration of improving zoom quality by automatically dispatching a multicopter, according to an embodiment of the system described herein.

FIG. 4 is a schematic illustration 400 of improving zoom quality by automatically dispatching the multicopter 150. Once it is established that the image 260 on the screen 210 of the operator has exhausted zooming capabilities of the fixed surveillance camera 130 but does not have a sufficient level of detail and clarity, the analytic and control component 310 dispatches the multicopter 150 to improve zoom quality. The component 310 may optimize a flight trajectory 410 and calculate key parameters 390 of the dispatching task, such as an initial flight time Δt to a target position P for flight of the multicopter 150 along the trajectory 410 (see FIG. 3 and the accompanying text for details). The flight time may be reflected by a progress indicator 420 on the screen 210 of the operator, showing a remaining time to screen update. Subsequently, the multicopter may be dispatched to a target position 430. At the target position 430, the multicopter may obtain a view 440 from the camera 160 of the multicopter 150 and may follow the unknown objects 180, streaming live video to the system via a video link 450, providing images 460 with the satisfactory quality and level of detail.

Figure 5:
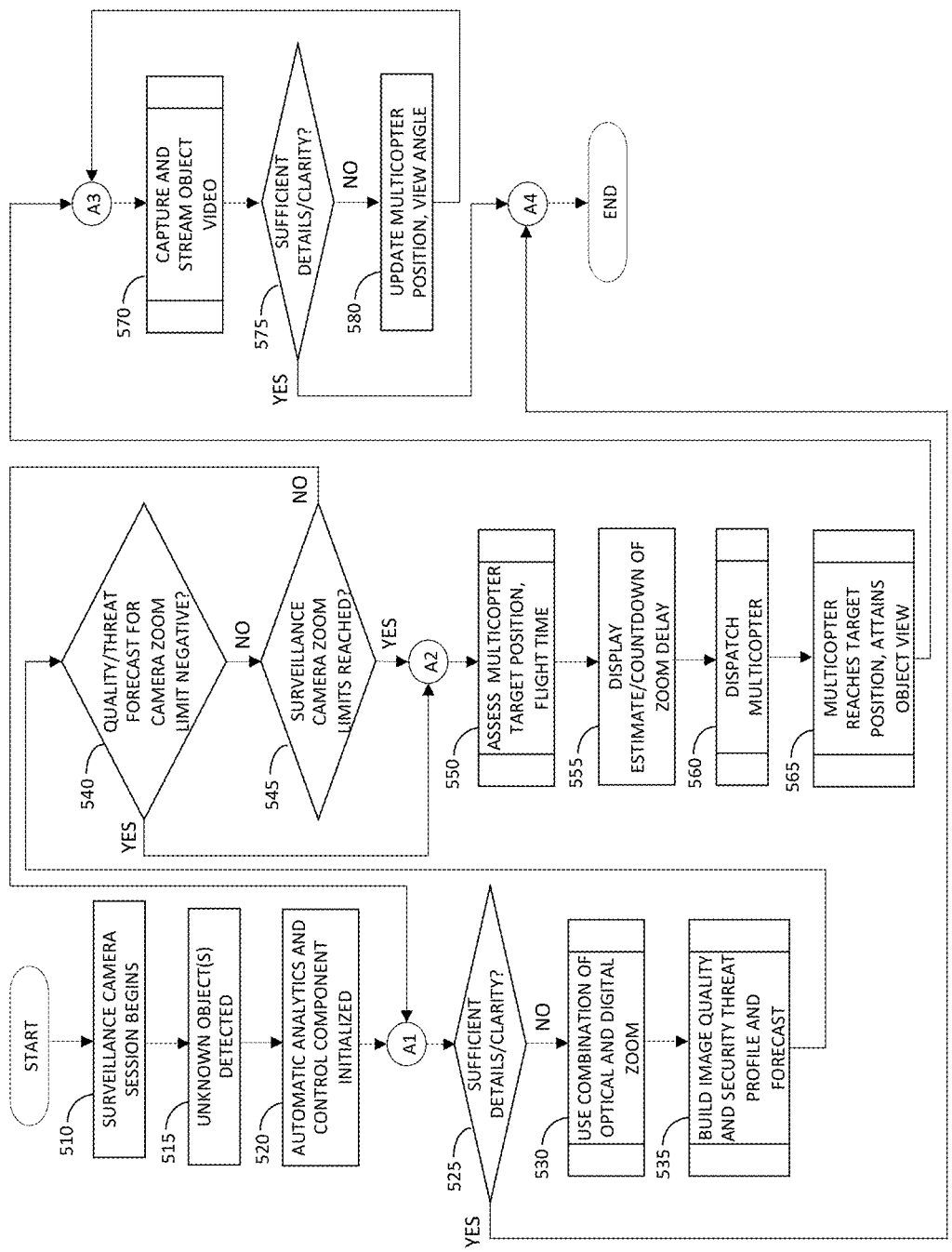
FIG. 5 is a system flow diagram illustrating system functioning in connection with combining a fixed camera with a multicopter-based camera for enhancing surveillance quality, according to an embodiment of the system described herein.

Referring to FIG. 5, a system flow diagram 500 illustrates system functioning in connection with combining a fixed camera with a multicopter-based camera for enhancing surveillance quality. Processing begins at a step 510, where a surveillance camera session begins. After the step 510, processing proceeds to a step 515, where unknown object(s) are detected (see FIGS. 1-4 and the accompanying text for more information). After the step 515, processing proceeds to a step 520, where the automatic analytics and control component of the system is initialized (see FIG. 3 for explanations). After the step 520, processing proceeds to a test step 525, where it is determined whether there is a sufficient level of detail and clarity of the images of unknown objects captured by the surveillance camera. If so, processing is complete; otherwise, processing proceeds to a step 530, where optical or digital zoom or a combination thereof are used with the surveillance camera to improve quality and legibility of images of the unknown objects, as explained elsewhere herein (see FIG. 2 and the accompanying text). After the step 530, processing proceeds to a step 535, where the automatic analytics and control component of the system builds the profile and forecast of image quality (size/details/clarity) and security threat posed by the objects, as shown in FIG. 3. After the step 535, processing proceeds to a test step 540, where it is determined whether the image quality and threat forecast for the state when the fixed camera zoom limit will be reached is negative (the negative scenario means that, per the forecast, at the time when the fixed camera reaches its zoom limit, the system will face a potentially damaging situation when the image quality is still insufficient for a reliable assessment of the unknown objects, whereas the assessed security threat from the object is significant). If it is determined at the test step 540 that the scenario is not negative, processing proceeds to a test step 545, where it is determined whether the limits of zoom capability of the surveillance (fixed) camera have been reached. If not, processing proceeds back to the test step 525, which may be independently reached from the step 520; otherwise, processing proceeds to a step 550, where a multicopter target position and flight time are assessed, as explained in FIGS. 3, 4 and the accompanying text. (Note that the step 550 may be independently reached from the step 540 if it is determined that the negative scenario for image quality and security thread is forecasted). After the step 550, processing proceeds to a step 555, where a zoom delay estimate or countdown related to multicopter flight time is displayed on the operator screen (see FIG. 4 and the accompanying text).

After the step 555, processing proceeds to a step 560, where the multicopter is dispatched for the surveillance task. After the step 560, processing proceeds to a step 565, where the multicopter reaches a target position and attains an object view for the unknown objects, as explained elsewhere herein (see FIG. 4 and the accompanying text for details). After the step 565, processing proceeds to a step 570, where the multicopter camera captures a video stream of the unknown objects and transmits the video stream to the screen of the operator. After the step 570, processing proceeds to a test step 575, where it is determined whether the frames of the video stream transmitted by the multicopter have sufficient detail and clarity. If so, processing is complete; otherwise, if the video stream transmitted by the multicopter has insufficient quality, processing proceeds to a step 580, where the multicopter position and view angle are updated to attain a better view of the unknown objects. After the step 585, processing proceeds to the step 570, which may be independently reached from the step 565.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: IOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of viewing an object detected within a property perimeter, comprising:
   using a fixed camera to view the object;
   adjusting at least one of: optical zoom and digital zoom of the fixed camera in response to an initial image of the object from the fixed camera being of insufficient quality to fully assess the unknown object;
   using different zoom levels of the fixed camera to determine a satisfactory zoom level based on a relationship between zoom level, image quality, and security threat forecast;
   dispatching a multicopter with a camera to a location of the unknown object in response to the fixed camera being unable to reach the satisfactory zoom level; and
   providing an image of the unknown object from the camera of the multicopter, wherein the relationship between zoom level and values of image quality, and security threat is provided using a forecast line corresponding to points on a two-dimensional surface in a three-dimensional space having axes corresponding to the zoom level and the values of the image quality and the security threat, and wherein the points correspond to specific pairs of values for security threat and image quality at different zoom levels.

2. The method of claim 1, wherein the multicopter is dispatched following interpolating the forecast line to determine that the fixed camera is unable to reach the satisfactory zoom level.

3. The method of claim 2, wherein dispatching the multicopter includes optimizing flight trajectory of the multicopter.

4. The method of claim 3, further comprising:
   displaying a countdown estimate of flight time for the multicopter to reach the unknown object.

5. The method of claim 3, wherein the camera of the multicopter provides an image as the multicopter approaches the unknown object.

6. The method of claim 5, wherein the flight trajectory is based, at least in part, on being able to view the unknown object using the camera of the multicopter as the multicopter is approaching the unknown object.

7. The method of claim 1, wherein the image from the fixed camera and the image from the camera of the multicopter are provided to a screen of an operator.

8. The method of claim 1, further comprising:
   determining reasons why the initial image from the fixed camera is of insufficient quality.

9. The method of claim 8, wherein the reasons include at least one of: distance between the fixed camera and the unknown object, a size of the unknown object, overall visibility conditions due to atmospheric and lighting conditions, reflective properties of one or more surfaces of the unknown object, or obstacles to a clear line-of-sight between the fixed camera and the unknown object.

10. The method of claim 1, wherein the unknown object is initially detected by the fixed camera.

11. The method of claim 1, wherein the unknown object is initially detected by a vibration sensor.

12. The method of claim 1, further comprising:
   adjusting at least one of: position of the multicopter and view angle of the multicopter in response to an initial image from the camera of the multicopter having insufficient quality.

13. The method of claim 1, further comprising:
the multicopter following the unknown object in response to movement by the unknown object.

14. A non-transitory computer readable medium containing software that facilitates viewing an object detected within a property perimeter, the software comprising:
executable code that uses a fixed camera to view the object;
executable code that adjusts at least one of: optical zoom and digital zoom of the fixed camera in response to an initial image of the object from the fixed camera being of insufficient quality to fully assess the unknown object;
executable code that uses different zoom levels of the fixed camera to determine a satisfactory zoom level based on a relationship between zoom level, image quality, and security threat forecast;
executable code that dispatches a multicopter with a camera to a location of the unknown object in response to the fixed camera being unable to reach the satisfactory zoom level; and
executable code that provides an image of the unknown object from the camera of the multicopter, wherein the relationship between zoom level and values of image quality, and security threat is provided using a forecast line corresponding to points on a two-dimensional surface in a three-dimensional space having axes corresponding to the zoom level and the values of the image quality and the security threat, and wherein the points correspond to specific pairs of values for security threat and image quality at different zoom levels.

15. The non-transitory computer readable medium of claim 14, wherein the multicopter is dispatched following interpolating the forecast line to determine that the fixed camera is unable to reach the satisfactory zoom level.

16. The non-transitory computer readable medium of claim 15, wherein dispatching the multicopter includes optimizing flight trajectory of the multicopter.

17. The non-transitory computer readable medium of claim 16, further comprising:
executable code that displays a countdown estimate of flight time for the multicopter to reach the unknown object.

18. The non-transitory computer readable medium of claim 17, wherein the camera of the multicopter provides an image as the multicopter approaches the unknown object.

19. The non-transitory computer readable medium of claim 18, wherein the flight trajectory is based, at least in part, on being able to view the unknown object using the camera of the multicopter as the multicopter is approaching the unknown object.

20. The non-transitory computer readable medium of claim 14, wherein the unknown object is initially detected by the fixed camera or by a vibration sensor.

* * * * *